W. M. Watson,

Mechanical Movement.

No. 106,523. Patented Aug. 16, 1870.

Witnesses
G. L. Chapin
Frank M. Pickerill

Inventor
William Medd Watson

United States Patent Office.

WILLIAM MEDD WATSON, OF TONICA, ILLINOIS.

Letters Patent No. 106,523, dated August 16, 1870.

IMPROVED MOTIVE POWER.

The Schedule referred to in these Letters Patent and making part of the same.

*To all whom it may concern:*

Be it known that I, WILLIAM MEDD WATSON, of Tonica, in the county of La Salle and State of Illinois, have invented an Improved "Motive Power for Driving Street-Cars;" and I do hereby declare that the following is a full and exact description thereof, which will enable those skilled in the art to make and use the same, reference being had to the accompanying drawing and letters marked thereon making a part of this description, in which—

Figure 1:
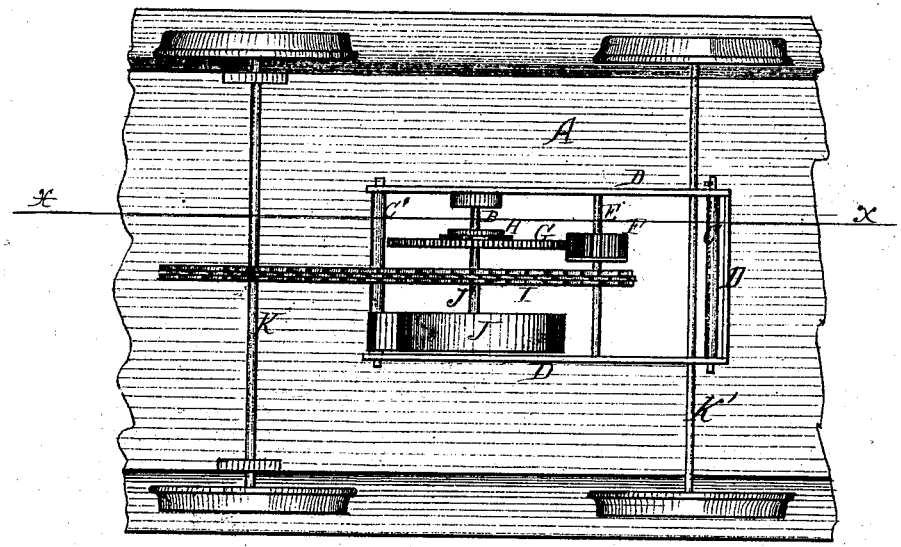

Figure 1 is an inverted view of a vehicle or car to which my motive power is applied.

Figure 2:
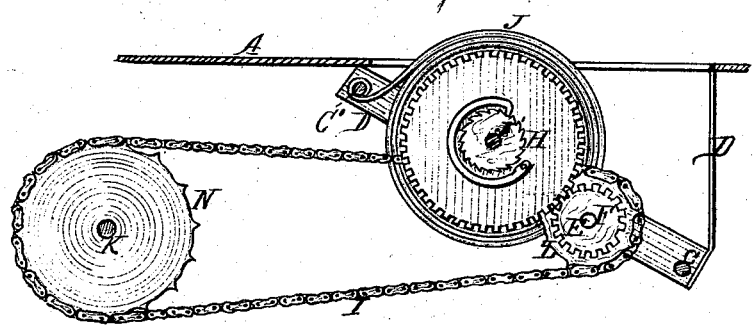

Figure 2, an upright sectional view of the mechanism used to propel the vehicle or car.

The present invention relates to the novel construction of mechanism devised to propel land conveyances, but more especially street-cars for cities, towns, &c., and its nature will be fully understood by the following description.

A represents the bottom of a carriage or car; and

K K', the journals of the wheels.

D D' represent a substantial frame-work, which supports a main shaft, J', rear journal K', and a shaft, E.

To the main shaft J' is attached a coil spring, J, which is used as a propelling power, the outer end of the spring being fastened to a post, C'.

H is an ordinary pawl and ratchet, which is fixed to a gear-wheel, G, so that the spring may be wound up in the usual manner.

The spring J drives the gear-wheel G, and the wheel G drives a pinion, F, on whose shaft is fixed an endless-chain wheel L, fig. 2, and to the forward journal K is fixed a similar endless-chain wheel N.

Around the wheels L N is placed an endless chain or belt, I, so that, when the pinion F is rotated, the belt I will be rotated, and cause the journal K to rotate and move the vehicle forward.

In order to wind up the spring J, a drum, B, is fixed to the shaft J', over which a belt may be put, and driven by any suitable power.

In practice, however, when the mechanism is applied to driving street-cars, stationary steam-engines are placed at suitable intervals, convenient to the track, so that a belt from said engines may be put over a pulley, B, and wind up the spring J in a short space of time; any suitable device being used to relieve the pulley B of the belt at the proper time, so as not to break the spring.

In the drawing only one spring is shown, but I intend to use any suitable number of springs that may be required to secure the requisite amount of power, and in doing this it may be necessary to place the springs on separate shafts, and connect the shafts by gearing, so that one or all of the springs may operate on the car-journals at the same time, and so that a wound spring may have its power applied on the journals between the points where the engines are placed. It may, however, in some instances, be necessary to equalize the power of the springs, in which a spiral compensating drum, similar to those in "English lever-watches," may be used, or any suitable governor may be applied.

Claim.

In the construction of mechanism for driving street-cars, the frame A D D, in combination with gearing K, H, G, and F, spring J, and endless chain I, as described.

WILLIAM MEDD WATSON.

Witnesses:
G. L. CHAPIN,
FRANK M. PICKERILL.